June 16, 1931.    P. J. LENGSHOLZ    1,810,616
GAS FIRED KILN
Filed Sept. 18, 1930

Inventor
Peter J. Lengsholz
By Frease and Bishop
Attorneys

Patented June 16, 1931

1,810,616

UNITED STATES PATENT OFFICE

PETER J. LENGSHOLZ, OF MASSILLON, OHIO

GAS FIRED KILN

Application filed September 18, 1930. Serial No. 482,726.

The invention relates to gas fired round or square kilns of either the down draft or up draft type for burning bricks and other clay products; and more particularly to a change of the construction of such kilns to increase the efficiency thereof and to improve the products burned therein when the kilns are fired solely with gas.

Down draft kilns generally include a series of fire boxes built in or external to the walls of the kiln, a series of baffles or bag walls built upward a certain distance from the kiln floor adjacent to the kiln side wall on the inner side of each fire box to deflect a portion of or all of the products of combustion from the fire box to the top of the kiln; together with a floor system including a series of floor bricks forming openings leading down into a series of sub-flues which in turn communicate with an underlying main flue, which in turn leads by a tunnel to a stack extending upward to a considerable height above the top of the kiln, so as to induce a substantial draft through the kiln.

Such kilns are commonly charged by setting bricks or other clay products to be burned in tiers, rows or stands upon the floor of the kiln, extending upward to or near the crown or top thereof; and clay products to be burned are staggered or spaced apart so as to form openings of various sizes and courses for permitting the products of combustion from the fire boxes to pass downward from the top of the kiln through the stacked clay products and kiln floor, to and through the flues and tunnel, and to and upward through the stack thereof.

In the past, when it has been found desirable or necessary to fire the kilns entirely with gas, gas pipes have been led to the usual fire boxes which are moist and damp due to the condensation from the damp clap products stacked within the kiln. After the gas burners have been lit, because of the fact that the fire box is cool and moist, extremely incomplete combustion takes place, which, together with the moisture arising from the drying of the green or unburned clay products, that condenses and adheres to the surface thereof causes unburned carbon to be deposited on the moist surfaces of the charge, which closes the openings therein and prevents the free flow of heating gases downward through the charge.

For these reasons, when it has been attempted in the past to fire a kiln solely by gas, the temperature in the kiln has not been raised sufficiently high enough to accomplish combustion of the gas and to properly burn the clay products until the kilns have been fired from four to six days when complete combustion of the gas begins to take place and the products commence to be burned.

Meanwhile, the amount of fuel which has been used, together with the incomplete combustion occurring, increases the cost of burning the clay products to an amount which is materially greater than it should be for proper economical operation of a kiln.

One of the objects of the present improvement is to provide what might be termed a complete gas furnace in the fire box construction of either round or square kilns of the down draft or up draft type.

A further object of the present invention is to provide for gas firing such kilns and at the same time decrease the gas consumption, shorten the burning period, accomplish complete combustion throughout the burning period, and generally reduce the cost of burning clay products, accompanied by the production of a more uniform product having a better color than has been previously accomplished with the use of gas fired kilns.

A further object of the present invention is to provide a fire box construction for gas fired kilns which will always be dry and which will heat up immediately upon lighting the gas so that complete combustion takes place therein and so that the temperature of the gases passing therefrom will be sufficiently high enough to prevent unburned carbon or soot from being deposited upon the clay products stacked in the kiln for being burned.

And finally, it is an object of the present improvements to provide for changing the fire box construction of existing kilns at an extremely low cost, or to provide for the construction of kilns in which the improved fire box construction is incorporated in the kiln without materially increasing the cost of building the kiln.

These and other objects may be attained by utilizing the improved gas fired kiln fire box, one embodiment of which is shown in connection with a round down draft type kiln in the drawings and described in detail, which may be stated in general terms as including in combination with a kiln, a fire box provided with a bag wall, walls forming a mixing chamber, a primary combustion chamber, and a secondary combustion chamber communicating with the kiln, a gas supply leading to the mixing chamber, an air supply leading to the mixing chamber, and passageways communicating between the mixing chamber and primary combustion chamber, and communicating between the primary combustion chamber and secondary combustion chamber.

The invention is shown in the accompanying drawings, in which

Similar numerals refer to corresponding parts throughout the various figures of the drawings.

Figure 1:
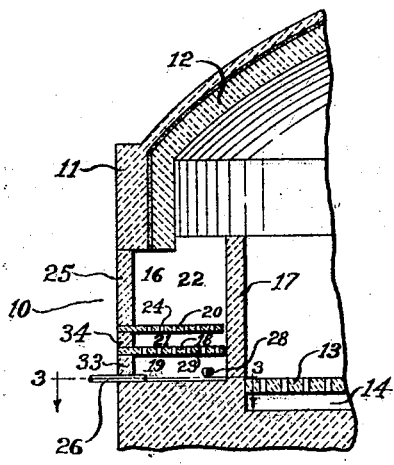
Figure 1 is a fragmentary vertical section through a portion of a round gas fired kiln of the down draft type provided with the improved fire box construction.

The invention may be applied to either round or square kilns of either the down draft or up draft type, the improved fire box for gas fired kilns indicated generally at 10 in the drawings being shown and described as applied to a kiln such as shown in the Lengsholz Patent No. 1,601,028, which kiln may include a circular side wall 11, an arched top or crown wall 12 and a floor system which may include floor bricks 13 having openings communicating with sub-flues 14 which in turn communicate with a main flue, tunnel and stack (not shown) all in accordance with common and well known standard practice.

Figure 3:
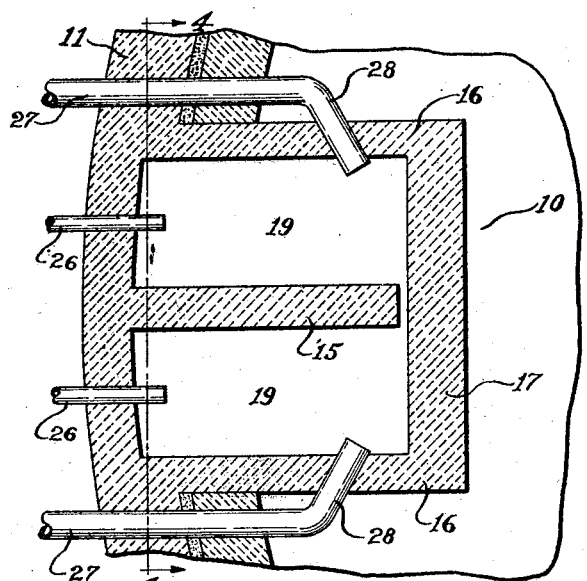
Fig. 3 is a plan section through the improved fire box taken on the line 3—3, Fig. 1.

For the purposes of the present invention, each fire box 10 is provided with a low central pier wall 15 intermediate its side walls 16, which pier terminates short of the bag well 17 as well shown in Fig. 3 of the drawings.

Arched walls 18 extend between the pier wall 15 and side walls 16 to form mixing chambers indicated at 19. In the drawings, one pier wall 15 and two mixing chambers 19 are shown, but depending upon the size of the fire box, these numbers may be decreased so that only one mixing chamber results, or may be increased so that there are three or more mixing chambers, without departing from the spirit of the present invention. Likewise, the wall 18 is not required to be arched as shown in the drawings, but may be a wall extending horizontally across the fire box to form one or more mixing chambers 19.

Spaced above the arched walls 18, there is provided preferably a horizontal wall 20 extending between the side walls 16 and terminating short of the bag wall 17 as shown in Fig. 1, to form in connection therewith the primary combustion chamber indicated generally at 21. Above the wall 20, there is formed a secondary combustion chamber 22 which communicates at its upper portion over the upper edge of the bag wall 17 with the interior of the kiln.

Each of the walls 18 and 20 are provided with apertures 23 and 24, respectively, which communicate respectively between the mixing chambers 19 and the primary combustion chamber 21, and between the primary combustion chamber 21 and secondary combustion chamber 22.

Figure 2:
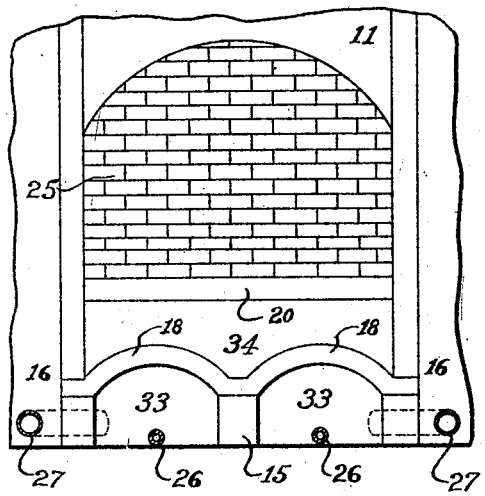
Fig. 2 is a front elevation of one of the improved fire boxes.
Figure 4:
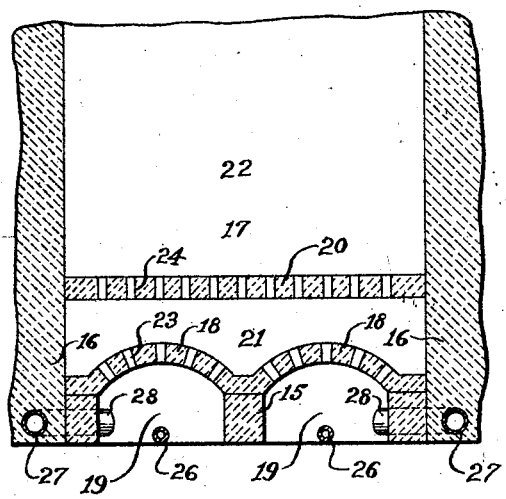
Fig. 4 is a vertical section through the improved fire box taken on the line 4—4, Fig. 3.

The chambers 19 are closed by the front walls 33, the chamber 21 being closed by the front wall 34, and the chamber 22 being closed by the front bricked wall 25, all as shown in Fig. 2. Gas mains 26 leading from any suitable gas supply enter the fire box through the walls 33 and terminate within the mixing chambers 19, while air mains 27 leading from any suitable source of air supply, enter the fire box through the side walls 16 and terminate with angular nozzles 28 in the mixing chambers 19.

In the operation of the kiln, after green clay products have been stacked therein, gas and air are turned on which become thoroughly mixed in the mixing chamber 19 and are lighted therein so that combustion immediately commences to take place, the flames issuing through the apertures 23 into the primary combustion chamber 21 where combustion of the gas more fully takes place, the flames therefrom issuing through the apertures 24 into the secondary combustion chamber 22 where combustion is completed and the hot gases pass out of the chamber 22 around the bag wall 17, into the kiln and through and around the clay products therein, finally passing out of the stack.

The walls 18 and 20 completely protect the chambers 19 and 21 from becoming damp or moist due to condensation from the damp unburned clay products stacked in the kiln, so that complete combustion takes place in the fire box immediately after the gas is lighted. Thus the hot gases heat up the kiln and the clay products stacked therein for being burned, to its maximum temperature within approximately one day as distinguished from four to six days, which has been the practice in the past when utilizing gas for firing the kilns.

Moreover, combustion of the gas being complete, no unburned carbon is deposited on the damp clay ware and the burned products accordingly have a better color.

After the kiln has been partially heated up, some of the bricks forming the front wall 25 may be removed so that additional excess air may be introduced into the secondary combustion chamber in order to assist in carrying out rapid complete combustion.

Accordingly, a most efficient furnace fire box construction is provided for utilizing gas for firing round or square down draft or up draft kilns and the like.

I claim:

1. Fire box construction for gas fired kilns, including walls forming a mixing chamber, primary combustion chamber and secondary combustion chamber, gas and air supply lines leading to the mixing chamber, and the walls being provided with openings communicating between the mixing chamber and primary combustion chamber and between the primary combustion chamber and secondary combustion chamber.

2. Fire box construction for gas fired kilns, including a bottom wall, side walls and a bag wall; a perforate wall spaced from the bottom wall extending between the side walls and a front wall extending between the side, bottom and perforate walls forming a mixing chamber; gas and air supply lines leading to the mixing chamber; a second perforate wall spaced from the perforate wall extending between the side walls and a second front wall extending between the side and perforate walls forming a primary combustion chamber, and a third front wall extending between the side walls and above the second perforate wall forming with the bag wall, second perforate wall, and side walls a secondary combustion chamber.

3. Fire box construction for gas fired kilns, including a bottom wall, side walls and a bag wall; a perforate wall spaced from the bottom wall extending between the side walls terminating short of the bag wall and a front wall extending between the side, bottom and perforate walls forming a mixing chamber; gas and air supply lines leading to the mixing chamber; a second perforate wall spaced from the perforate wall extending between the side walls and a second front wall extending between the side and perforate walls forming a primary combustion chamber, and a third front wall extending between the side walls and above the second perforate wall forming with the bag wall, second perforate wall, and side walls a secondary combustion chamber.

4. Fire box construction for gas fired kilns, including a bottom wall, side walls and a bag wall; a perforate wall spaced from the bottom wall extending between the side walls terminating short of the bag wall and a front wall extending between the side, bottom and perforate walls forming a mixing chamber; gas and air supply lines leading to the mixing chamber; a second perforate wall spaced from the perforate wall extending between the side walls terminating short of the bag wall and a second front wall extending between the side and perforate walls forming a primary combustion chamber and a third front wall extending between the side walls and above the second perforate wall forming with the bag wall, second perforate wall, and side walls a secondary combustion chamber.

In testimony that I claim the above, I have hereunto subscribed my name.

PETER J. LENGSHOLZ.